United States Patent [19]

Gerhardt et al.

[11] Patent Number: 4,625,502
[45] Date of Patent: Dec. 2, 1986

[54] PRESS FOR FORMING CYLINDRICAL BALES

[75] Inventors: Ralph A. Gerhardt, Bettendorf, Iowa; Jean Viaud, Sarreguemines, France

[73] Assignee: Deere & Company, Moline, Ill.

[21] Appl. No.: 692,601

[22] Filed: Jan. 18, 1985

[30] Foreign Application Priority Data

Jan. 19, 1984 [EP] European Pat. Off. ........ 84400111.5

[51] Int. Cl.⁴ ............................................. A01F 15/18
[52] U.S. Cl. ......................................... 56/341; 100/88
[58] Field of Search ................. 56/341, 343, 344, 364; 100/88

[56] References Cited

U.S. PATENT DOCUMENTS 4,510,861  4/1985  Campbell et al. ...................... 56/341
4,514,969  5/1985  Moosbrucker et al. ............... 56/341

Primary Examiner—Paul J. Hirsch

[57] ABSTRACT

A press for forming large cylindrical bales includes a forward bale chamber for forming a bale core during the time a full sized bale located in a main bale chamber is being tied and discharged. A set of belts are mounted on a vertically shiftable roller so as to form a loop that delimits a rear portion of the forward chamber and a rear portion of the main chamber when the roller is in a lowered position and which is moved out of the way to permit a formed bale core to move from the forward chamber into the main chamber when the roller is in a raised position. In one embodiment a conveyor delimits the bottom of the forward chamber and cooperates with a first pickup to feed crop material to the forward chamber. A second pickup is arranged for delivering crop material directly into the main chamber. In a variant to the first embodiment a longer conveyor is used and the second pickup is omitted. The first pickup and longer conveyor cooperate to deliver crop material to the main chamber. In a second variant to the first embodiment, the conveyor and second pickup are omitted with a set of belts being arranged to delimit the bottom of the forward chamber and with the belt set loop and first conveyor being located for feeding crop material into the forward chamber when the shiftable roller is lowered and for feeding material to the main chamber when the roller is raised.

1 Claim, 3 Drawing Figures

PRESS FOR FORMING CYLINDRICAL BALES

BACKGROUND OF THE INVENTION

The present invention relates generally to presses for forming cylindrical or round bales, of the type comprising sets of bands or belts which, by their displacement, form by rolling up within a chamber provided in the body of the press a large diameter bale of generally cylindrical shape from harvested products, especially forage or hay collected on the field by a pickup in the course of the advance of the press and conveyed in the form of a web to the bale-forming chamber. When the bale so formed has attained the required diameter, it is subjected to a binding operation, and then ejected or discharged usually via a door system provided at the rear of the press.

It is known that the operations of binding and discharging bales formed in the chamber of the press require a certain amount of time during which the press is stationary, which consequently reduces the output of a machine of this type.

A drawback of presses for forming cylindrical bales, the advantages of which compared with presses for forming rectangular bales are well known, consists precisely in this reduction in output or capacity which results from the stoppage times required for the binding and the discharge.

Now, the present tendency in agricultural mechanism technology is to increase as much as possible the capacity or the output of the machines or devices used in a farm.

It has already been proposed to remedy this drawback in a manner enabling the cylindrical bale-forming press to proceed with its advance across the field and to continue to collect the harvested products during the operation of binding and discharging the bale already formed in the press. Thus, there has been described in U.S. Pat. No. 3,004,377 an arrangement which enables the harvested products collected during the binding and the discharge of a bale to be retained or accumulated on the press.

An arrangement having the same end in view is to be found in U.S. Pat. No. 4,145,964, which describes a press in which a member in the form of a grid is positioned between the pickup or the associated elevating device and the chamber of the press when a bale has attained the required diameter and is in the process of being bound and then of being discharged, this member being in the form of a grid being then displaced automatically so as to withdraw it out of the way, thereby enabling the accumulated harvested products to enter the chamber of the press.

Yet another similar arrangement has been proposed in German patent application Ser. No. 2,634,638, in which the member which intercepts the harvested products and becomes interposed between the pickup or the elevator and the chamber of the press during the binding and the discharge of a bale is constituted by one or more conveyor belts travelling over rollers, the assembly being displaced automatically so as to assume an interception position during the binding and the discharge and to be retracted to an out-of-the-way position for the normal formation of a bale.

Even if the known arrangements remedy the disadvantage consituted by the need to stop the press during the binding and the discharge of a bale, another disadvantage nevertheless consists in the fact that the mass of harvested products thus retained during these binding and discharge operations is not compressed at the time of its transfer into the chamber of the press to the degree that is desirable for forming the core of a new bale.

Now, it has been proved to be desirable, in order to obtain bales which are as well formed as possible and in order to facilitate the formation thereof in the chamber of the press, that the harvested products collected during the tying and discharge operations should themselves be compressed so as to constitute effectively a core around which the bale will be able to continue being formed within the chamber of the press.

It has already been proposed in U.S. Pat. Nos. 4,009,559; 4,011,711; 4,022,003; 4,035,999; 4,052,841; 4,057,954 and 4,062,172 to provide a solution to this problem. In each of the arrangements to which these prior U.S. Patents relate, there is provided a relatively long press chassis on which are mounted two sets of bands or belts which provide two independent product rolling-up chambers, that is to say a rear forming chamber properly so called in which a cylindrical or round bale can attain the required diameter, in which the tying is effected and from which the finished bale is discharged, and a front chamber in which a bale core is formed by rolling up from the harvested products during the operations of tying and discharging a finished bale, means being provided for retaining the harvested products within this first or front chamber during these binding and discharging operations. The press is then provided in its front part with a pickup of the usual type and in its rear part with a conveyor of great length on which the harvested products are displaced, so that they travel past the zone corresponding to the front chamber, without passing through it, into the rear chamber for the formation of the bale.

An obvious disadvantage of an arrangement of this type consists in the substantial increase in length which then results therefrom for the press, due to the presence of two chambers located one behind the other on the chassis of the press and defined by two sets of bands or belts which are independent of each other.

SUMMARY OF THE INVENTION

According to the present invention there is provided a novel solution to the problem so posed, making it possible to produce a press for forming cylindrical or round bales which is capable of forming a dense bale core from the collected harvested products during the binding and discharge of a bale, without unacceptably increasing the dimensions of the press or its weight.

An object of the invention is to provide a press for forming cylindrical or round bales including bands or belts which delimit a main bale-forming chamber and also at least partly delimit a core-forming chamber, to provide means for selectively directing the harvested products from the ground to this main chamber or to this core-forming chamber, and to provide other means arranged to provide a passage for the transfer of this core from the core-forming chamber to the main chamber after the discharge of a bale from the latter.

A more specific object is to provide a first embodiment wherein the bands or belts which roll up the harvested products for the formation of the bale in the main chamber include a forward portion which forms a rear portion of the core-forming chamber, this forward portion being supported by a roller which is displaceable between a lower position wherein these bands or belts extend between the two chambers and an upper position in which a passage is provided between the said chambers.

Another object of the invention is to provide a press as aforedescribed wherein the bands or belts which form portions of the main chamber are supported by rollers such that they completely or almost completely delimit the bale core-forming chamber, this chamber being completed by a short lower conveyor belt.

A further object of the invention is to provide a press embodiment including two pickups, one of which is associated with the core-forming or front chamber and the other with the main chamber, with at least the front pickup being displaceably mounted so as to be able to be raised during the formation in the usual way of a bale in the main chamber.

A further object is to provide a constructional variant, wherein there is provided on the press a single pickup associated with a lower conveyor belt, these elements being displaceable between a position in which the pickup directs the harvested products to the primary chamber and another position in which these harvested products are directed by this pickup and by the conveyor belt to the main chamber.

Yet another object in accordance with yet another variant, is to provide a single pickup located substantially between the forward and main chambers and normally operable to direct the collected harvested products to the main chamber, in combination with means which divert these harvested products towards the forward chamber during the binding of a bale in the main chamber and the discharge thereof from the latter.

Still another object is to provide a set of belts which include a portion forming part of forward and main chambers and supported by a movable roller controlled such that the closure of the door brings about the raising of the roller so as to establish a passage between the front and the main chambers and to provide means for ensuring the transference of the bale core formed in this forward chamber into the main chamber.

These and other objects, features and advantages of the present invention will become apparent to those skilled in the art from the description which follows and from the drawings.

DESCRIPTION OF THE PREFERRED EMBODIMENT

Figure 1:
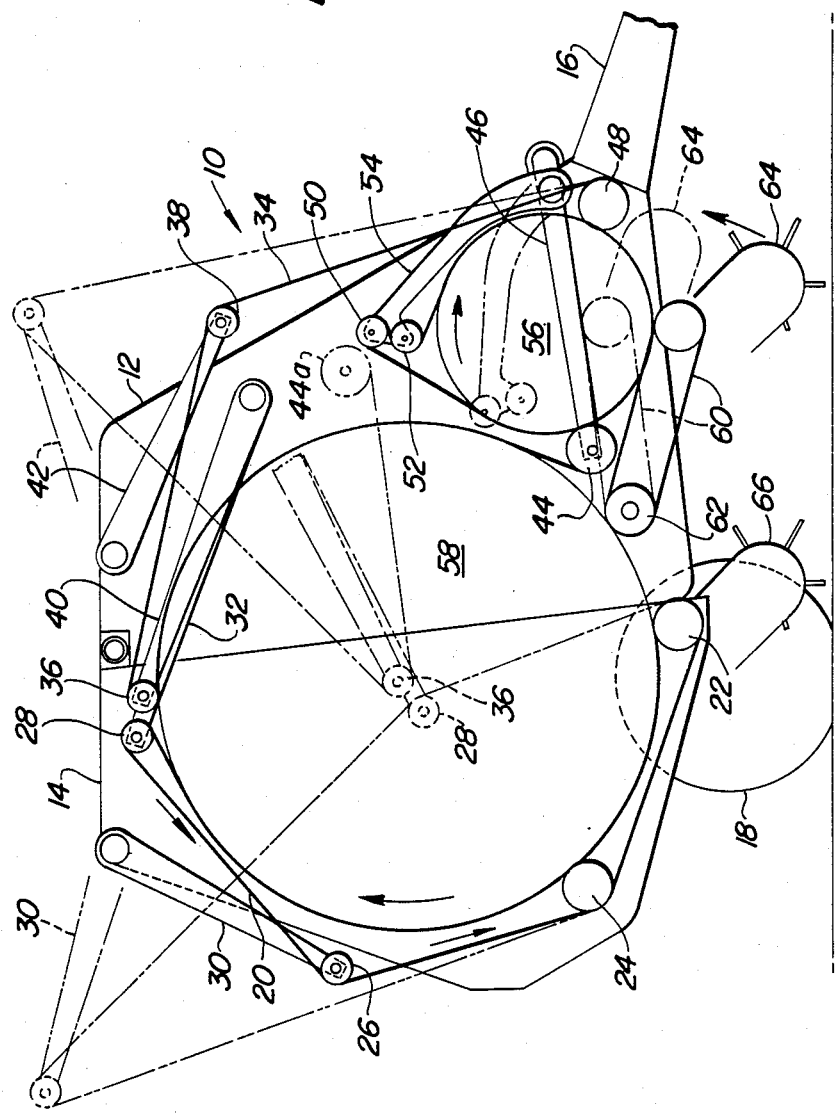
FIG. 1 is a schematic outline drawing of a press according to the invention for forming cylindrical or round bales.

In FIG. 1 a press for forming large diameter cylindrical or round bales has been indicated by the reference 10, the chassis and body of which press has not been shown in detail. This body comprises a fixed front part 12 and a raiseable rear door 14. The chassis is provided with a drawbar 16 enabling the press to be coupled to a tractor. It is supported by a pair of wheels 18.

The press comprises a first set of bands or belts 20 passing over fixed rollers 22 and 24 and over movable rollers 26 and 28, the supporting arms for the roller 26 being indicated at 30 and the supporting arms for the roller 28 being indicated at 32. The springs that bias the arms placing the belts in tension, which are conventional per se, have not been shown. The position of the bands or belts 20 at the beginning of the formation of a bale is shown in broken lines and the position of these bands or belts 20 when the bale has attained its maximum diameter in full lines.

The press likewise comprises, in a manner which is conventional per se, a second set of bands or belts 34. Two movable rollers of these bands or belts have been indicated at 36 and 38, the roller 36 being carried by arms 40 and the roller 38 being carried by arms 42. In this case once again the resilient members that bias the tensioning arms of the bands or belts have not been shown.

According to the invention, there is provided in combination with the bands or belts 34 a movable roller 44, which is carried by arms so as to be displaceable in a substantially vertical direction. This roller has been shown in full lines at 44 in a working position of the press and in broken lines at 44a in a transfer position which will be described later.

In the case of the arrangement shown, the bands or belts 34 also pass over a stationary roller 48 provided on the front part of the press, as well as over two movable rollers 50, 52 carried by an arm 54 pivotally mounted towards the front part of the press.

FIG. 1 shows that, in the condition of the bands or belts 20 and 34 shown in full lines, in which the roller 44 occupies its lower position, the runs of the bands or belts near this roller divide the press into two chambers, namely a front or bale core-forming chamber 56 and a rear or main chamber 58.

The chamber 56 is delimited over almost the whole extent thereof by the bands or belts 34, due to their passage around the roller 44 in its lower position, over the rollers 50 and 52 and over the roller 48. This chamber 56 is completed, in the operative position shown in full lines, by a short lower conveyor belt 60 which can pivot about the axis of a rear roller 62 and carries a forward pickup indicated schematically at 64. Another pickup 66 is shown schematically behind the previous one, just in front of the wheels 18.

The position of the press shown in full lines in FIG. 1 corresponds to the condition obtained at the end of the binding operation, at the moment of discharge of a bound bale from the main chamber 58 of the press. The forward pickup 64 is then located in the low-down position, so that, during the advance of the press across the field in the course of the binding operation, the harvested products collected by the pickup 64 are directed to the forward chamber 56, in which it forms by rolling up a bale core as shown, between the adjoining parts of the bands 34 and the lower conveyor 60. The condition shown in full lines corresponds to a substantially maximum diameter of the bale core so formed in the forward chamber 56.

Consequently, during the operations of binding and discharging a bale formed in the main chamber 58, the press can continue its progress across the field, the collected products forming in the forward chamber 56 a dense or compressed bale core by rolling up between the runs of the bands 34, due to the tension applied by the springs, which are conventional per se, acting on the arms 54 carrying the movable rollers 50, 52 of the press.

When the discharge operation is terminated and when the door 14 of the press is reclosed, the roller 44 is displaced upwardly as far as the position 44a, the bands or belts then occupying the position indicated in broken lines. This raising of the roller 44 as far as the position 44a thus establishes a passage between the forward chamber 56 and the main chamber 58 of the press, so that the bale core formed in the forward chamber 56 can be transferred to the main chamber 58. This transfer is ensured by the fact that the bale core is no longer held at its rear part by the bands or belts 34 passing over the roller 44. After this transfer, the short conveyor belt 60 is raised, together with pickup 62, by pivotal movement about the axis of the rear roller 62, so as to assume the position indicated in broken lines and the arm 54 rocks downwardly about its pivot axis so as to assume likewise the position indicated in broken lines.

After the transfer of the bale core from the forward chamber 56 to the main chamber 58, the roller 44 is lowered from the position 44a to the lower position shown in full lines, which again limits the main chamber at its front part.

Since the forward pickup 64 is raised, it no longer collects the harvested products lying on the ground in the form of a swath and these harvested products are collected by the rear pickup 66 and then transferred directly to the main chamber 58, within which the said products are rolled up around the bale core already formed, which increases in diameter until a complete bale is formed.

When this bale attains the required diameter, the binding operation is started in a manner which is well known per se. At this moment, the short conveyor belt 60 and the pickup 64 are lowered by pivotal movement, so that the harvested products lying on the ground are now collected again by the pickup 64 and transferred to the core-forming chamber 56, in which another bale core can be formed during the binding of the previous bale and its discharge.

The cycle described above is repeated when the bale has been discharged from the main chamber and when the door 14 of the press has been reclosed.

The means provided on the press for bringing about the various different movements, more especially the raising and lowering of the return roller 44, the pivotal movement of the conveyor belt 60 together with the pickup 64, etc., may be of a type which is conventional on presses of this type and are well known to technicians specializing in this field, so that it does not seem to be necessary to describe them in detail.

Figure 2:
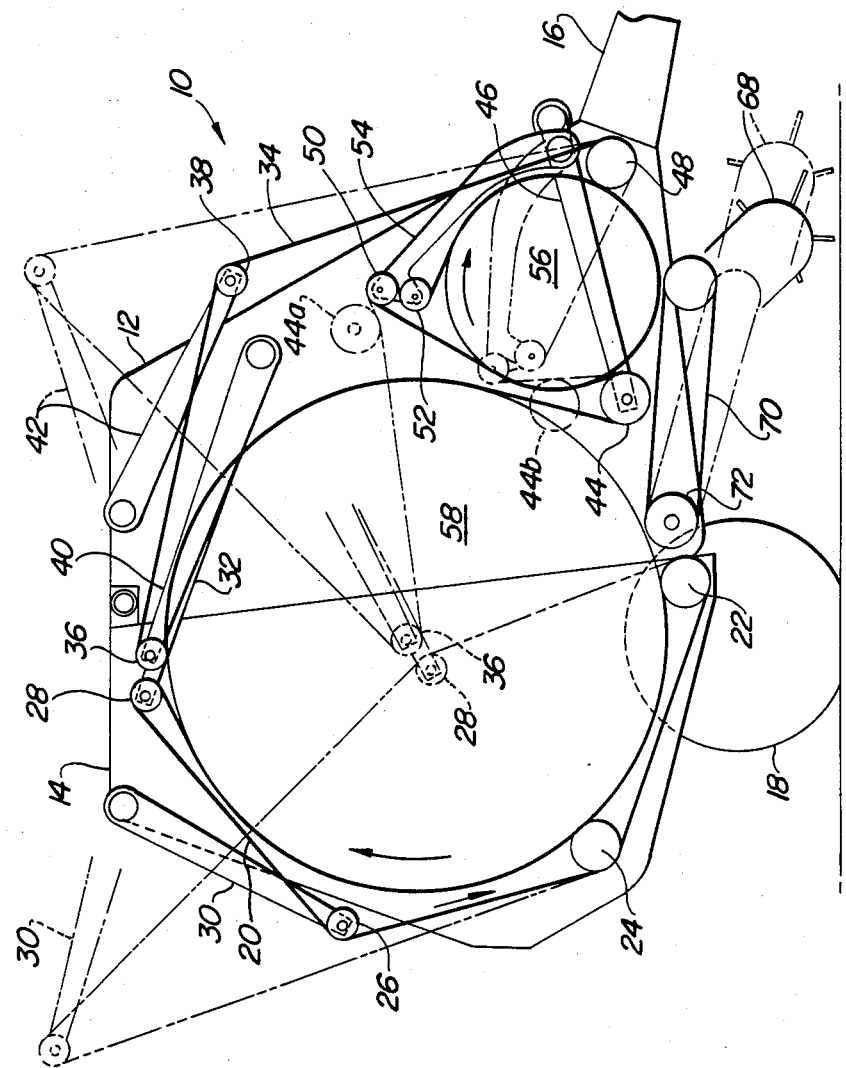
FIG. 2 is a similar view corresponding to a variant.

In FIG. 2 of the drawings, in which the same references as before have been used to designate corresponding elements, there has been shown a constructional variant of the press comprising a single pickup 68 which is connected to a conveyor belt 70 mounted for pivotal movement about its rear roller 72.

This conveyor belt 70 and the pickup 68 may, in the course of operation, occupy two different positions. One position is shown in full lines in FIG. 2, in which the collected harvested products are guided directly into the core-forming chamber 56 of the press, this chamber being delimited at its lower part by a part of the conveyor belt 70 and at its top, front and rear parts by the bands or belts 34 passing over the return roller 44 in the lower position, so that it forms here once more inside this chamber 56 a dense and compacted bale core, due to the fact that there is pressure exerted on the harvested products by the run of the bands or belts 34 extending between the roller 48 and the rollers 50, 52 due to the action of resilient members acting in a conventional manner on the arms 54. These arms 54 in this case once again undergo a withdrawal movement as the diameter of this bale core increases, in a manner which is usual per se in presses of this type.

When the bale, the formation of which has been completed in the main chamber 58 of the press, has undergone the binding operation and has been discharged and when the rear door 14 of the press has been reclosed, the roller 44 is raised as far as its upper position indicated at 44a, which operation produces a passage between the forward chamber 56 and the main chamber 58 to permit the transfer of a bale core formed in this forward chamber, a transfer which takes place under the conveying action produced by the conveyor belt 70 and due to the fact that the bale core is no longer held back by the runs of the bands or belts 34 which extend between the two chambers.

After this transfer, the roller 44 is again lowered, but this time only as far as the position indicated in broken lines at 44b and the conveyor belt 70 is itself lowered by pivoting it about its rear return roller 72, so as to assume the position indicated in broken lines, the pickup 68 pivoting slightly upward with respect to the conveyor belt 70 in order to avoid contact thereof with the ground. These positions of the return roller at 44b, of the conveyor belt 70 and of the pickup 68 ensure the forwarding of the products collected on the ground directly to the main chamber 58 of the press, so that the formation of the bale can be proceeded within this chamber.

When the bale has attained the required diameter, the binding operation is started. Simultaneously, the roller 44 is brought from the position 44b to its lowered position and the conveyor belt 70 is raised as far as the position indicated in full lines, so that the harvested products which continue to be collected by the pickup 68 are then guided directly to the core-forming chamber 56 for the formation therein once more of a dense and compact bale core during the binding and the discharge of the bale of maximum diameter.

The cycle described above is then repeated in the same manner.

Figure 3:
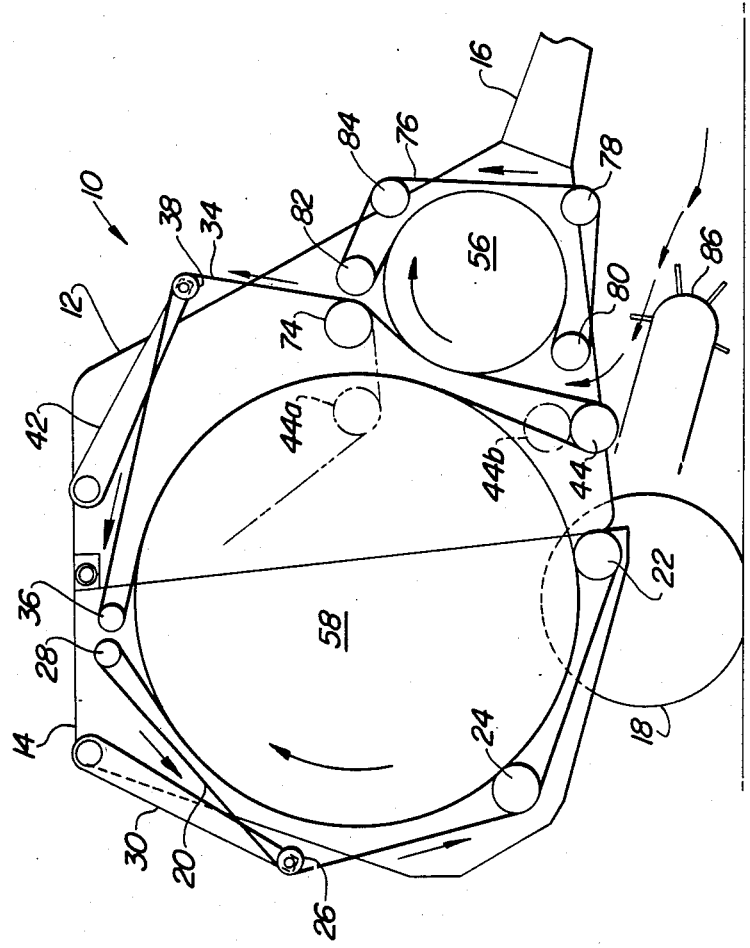
FIG. 3 is a similar view corresponding to another variant.

In FIG. 3, in which the same references as previously have been used to indicate equivalent parts, there is shown yet another variant of the press according to the invention.

In this case, the bands or belts 34 which pass over the roller 44 likewise pass over a stationary roller 74 instead of the roller 50 mentioned previously. In addition, there is provided a third set of bands or belts 76 which pass over stationary rollers 78, 80, 82 as well as over a movable tensioning roller 84 supported by arms (not shown) in a manner which is conventional per se, these bands or belts 76 delimiting in conjunction with the above-mentioned rollers the upper, front and bottom parts of the forward chamber 56. There is provided in addition on the press a stationary pickup 86, which is located substantially between the forward and main chambers 56 and 58, respectively.

During the operations of binding a bale in the main chamber 58 of the press and of discharging this bale, the return roller 44 occupies the lower position indicated in solid lines and, by means of the bands or belts 34 which are travelling in the direction indicated, effects the delivery of the harvested products collected on the ground to the forward chamber 56 for the formation of a dense and compact bale core within this chamber.

When the discharge of the bale is ended and when the rear door of the press is reclosed, the roller 44 is raised as before as far as a position 44a which produces a passage between the forward 56 and main 58 chambers. The bale core formed in the forward chamber 56 is then transferred as far as the main chamber 58 under the action of the resilient force from the roller 84 acting through the intermediary of the bands or belts 76. When this transfer is completed, the roller 44 is returned downwardly as far as a position indicated at 44b, which provides a free passage for the harvested products collected by the pickup 86 directly to the main chamber 58.

When the bale formed in this main chamber has attained its maximum diameter, the binding operation is started in the usual way and the roller 44 is displaced downwardly to its solid line lower position and intercepts the harvested products collected by the pickup 86 in order to direct them to the primary chamber 56 in which a bale core is once again formed.

In this case also, the cycle described earlier is repeated after the binding and the discharge of a bale.

It is apparent that, in each of the embodiments considered, there is formed in the forward or core-forming chamber of the press, during the binding of a bale in the main chamber and during its discharge through the rear door of the press, a dense and compact bale core which is then transferred to the main chamber when the rear door is reclosed after the discharge of a bale. Thus, the press can continue its progress in the field during the binding and discharge operations.

This result is obtained without appreciably increasing the length of the chassis of the press or its weight, since the core-forming chamber is at least partly delimited by the bands or belts which also form the main chamber and since this core-forming chamber is separated from this main chamber only by a loop or double run of bands or belts passing over a roller which is displaceable between a lower position separating the chambers and an upper position establishing a transfer passage from one of them to the other. It is understood that, in this part of the press, the runs of the bands or belts of the loop may be located very close to each other, so that there is, as a result, practically a juxtaposition of the two chambers, which reduces the bulk to a minimum. Besides, the collected harvested products are guided directly to one or the other of the two chambers considered.

Modifications can be made in the embodiment described, within the field of equivalent techniques, without deviating from the invention.

We claim:

1. A press for forming large cylindrical bales, comprising: a mobile frame including a fixed front part and a rear part forming a raisable door pivotally connected to the front part; a first set of transverse rollers supported by the rear part of the frame and including a lower front fixed roller; second and third sets fo transverse rollers supported by the front part of the frame; first, second and third sets of endless belts respectively being supported by the first, second and third sets of rollers with the sets of rollers being arranged such that the first and second sets of belts cooperate to form a main bale-forming chamber and the second and third sets of belts cooperate to form a bale core-forming chamber forwardly of the main bale-forming chamber; said second set of rollers including a lower rear roller mounted between the bale-forming and bale core-forming chambers for vertical movement between lowered and raised positions; a pickup mounted to the frame and extending close to but beneath said lowered position to a location forwardly of said lower front fixed roller of the first roller set; said third set of rollers including a fixed lower rear roller spaced forwardly of said lowered position, a fixed lower front roller, a fixed upper rear roller and a movable upper front tensioning roller; said third set of rollers being so located that when a bale core is located in the bale core-forming chamber and the lower front roller of the second set of rollers is moved to its raised position, the tension in the third set of belts acts to force the bale core rearwardly past the lower rear roller of the third set of rollers into the main bale-forming chamber; and said pickup being located relative to the bale core and bale-forming chambers and to the lower front roller of the second set of rollers so that when the last-mentioned lower front roller is in its lowered position the pickup cooperates with the roller and loop to move crop material into the core-forming chamber and when the roller is raised to a position intermediate its lowered and raised position, the pickup moves crop material directly into the bale-forming chamber.

* * * * *